United States Patent [19]

Berman

[11] 4,416,632
[45] Nov. 22, 1983

[54] PAINT-BY-NUMBERS KIT

[75] Inventor: Mort Berman, Brooklyn, N.Y.

[73] Assignee: Avalon Industries, Inc., Brooklyn, N.Y.

[21] Appl. No.: 250,626

[22] Filed: Apr. 2, 1981

[51] Int. Cl.³ .............................................. G09B 11/10
[52] U.S. Cl. ...................................... 434/84; 206/1.8; 206/575
[58] Field of Search ......................................... 434/84

[56] References Cited

U.S. PATENT DOCUMENTS

| 841,360 | 1/1907 | Tuck | 434/84 |
|---|---|---|---|
| 2,744,349 | 5/1956 | Grossman | 434/84 |
| 2,825,150 | 3/1958 | Steiner | 434/84 |
| 2,954,615 | 10/1960 | Brown | 434/84 |

FOREIGN PATENT DOCUMENTS 957670  5/1964  United Kingdom .................. 434/84

Primary Examiner—Harland S. Skogquist
Attorney, Agent, or Firm—Kirschstein, Kirschstein, Ottinger & Cobrin

[57] ABSTRACT

A novel paint-by-numbers kit containing a panel board with a non-porous paper mounted thereon. The paper contains thereon a plurality of different unpainted picture areas and a plurality of different water-insoluble portions together constituting an unpainted picture to be painted by a user. Also contained in the kit is a plurality of different water-based paints for coloring the unpainted picture areas. The paints form a layer of transparent color on the non-porous paper of the panel board. Each unpainted picture area is associated with a water-soluble indicia number for indicating to the user which of the different paints to apply to each unpainted picture area. Each different paint is separately identified by a selector number which corresponds to an appropriate indicia number. In using the paint-by-numbers kit, the user wets a paint brush which is supplied with the kit and rubs the wetted paint brush on the paints. The user proceeds to apply the paint to the unpainted picture area until all of the unpainted picture area are colored. The wet water-based paints cause the water-soluble indicia numbers to disappear while allowing the water-insoluble portions to remain visible on the finished picture. Hence, the finished picture is not marred by the presence of indicia numbers and the water-insoluble portions, which are important parts of the completed picture, remain visible.

6 Claims, 4 Drawing Figures

U.S. Patent  Nov. 22, 1983  4,416,632
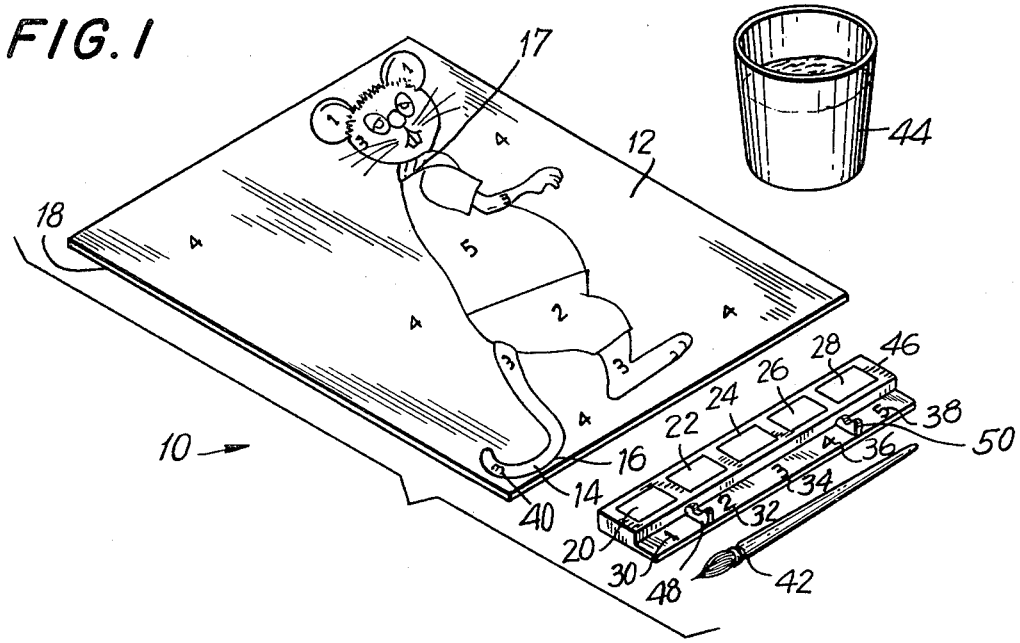
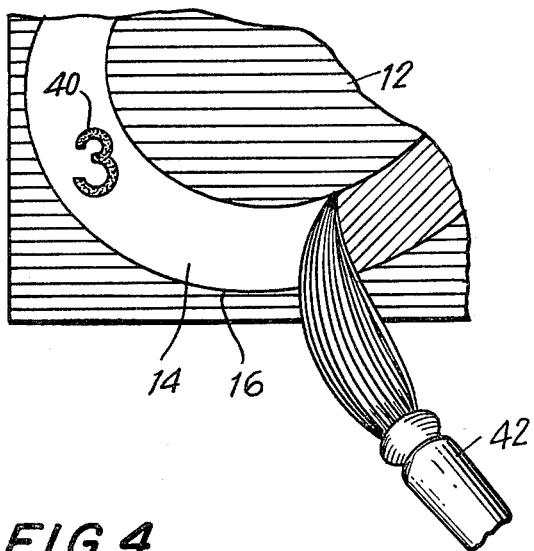
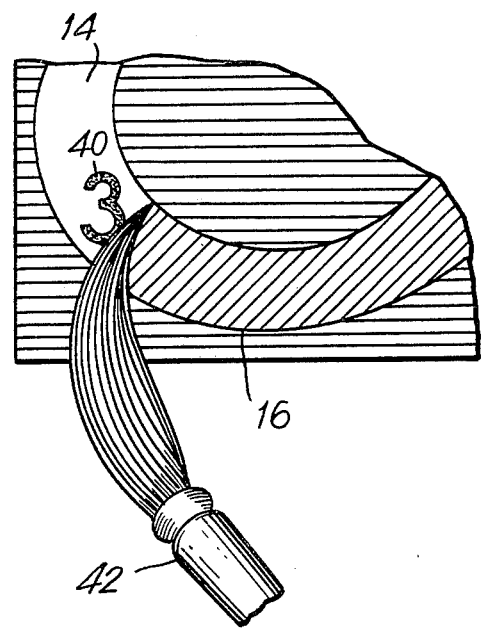
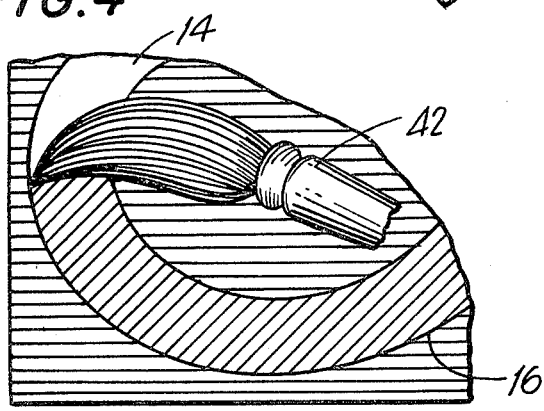

PAINT-BY-NUMBERS KIT

BACKGROUND OF THE INVENTION

1. Field of the Invention

This invention generally relates to a paint-by-numbers kit, and more particularly to a paint-by-numbers kit with water-based paints and paint-by-numbers coloring books or coloring pages employing water-soluble disappearing color guide numbers and water-insoluble outlines and color separating lines.

2. Description of the Prior Art

Paint-by-numbers kits, for both children and adults, are well known. Most paint-by-numbers kits utilize coloring books having color guide numbers printed with water-insoluble inks on the not yet colored drawings. In order to assure that these numbers do not show through the applied colors, opaque paints are used. Although this type of paint conceals the guide numbers, unless a user exercises extraordinary care, some of the paint encroaches and obscures the outlines defining the drawings and on the lines separating different portions of the drawings that are to be differently colored. This obliteration of the outlines and/or color separating lines is particularly undesirable when the drawing to be colored is a cartoon-like one in which the outlines and color separating lines are an integral part of the completed picture and should remain visible.

When the paints provided with the prior paint-by-numbers kits are not opaque, another problem occurs. The guide numbers remain visible after the drawing is colored, marring the appearance of the completed picture.

One attempt to overcome the disadvantages set forth above was to print the drawing to be colored without any numbers for guiding the user in color selection. The user was shown what color to paint each portion of the drawing by including in the kit a miniature version of the picture, pre-painted with the appropriate colors. Although this system avoided the aforementioned problems it too was not without drawbacks. Due to the miniature size of the pre-painted picture it often was difficult to see what portions were to be painted with what colors, particularly in small areas. Further, when a number of the colors were similar a user had difficulty ascertaining which of similarly colored supplied paints should be applied to the different portions of the unpainted drawing. Additionally, the printing of a miniature pre-painted picture increased the cost of manufacturing the kit. This system, further, did not prevent obliteration of the outlines and color separating lines.

The use of non-water-based paints in the prior art kits created other problems. If a user accidentally applied paint to his hands, it was not easily washed clean with soap and water. If paint was accidentally applied to furniture, which was not that unusual when the kit was used by a child, an even bigger cleanup problem arose and sometimes the soiled furniture could not be cleaned at all.

SUMMARY OF THE INVENTION

1. Objects of the Invention

It is an object of this invention to provide a paint-by-numbers kit which is not subject to the drawbacks of the prior art kits.

It is another object of this invention to provide a paint-by-numbers kit of the character described which includes water-based paints.

It is still a further object of this invention to provide a paint-by-numbers kit of the character described which includes water-soluble disappearing color guide numbers.

Another object of this invention is to print the outline and color separating lines of a paint-by-numbers drawing in a manner such that they will not be obliterated by the paint.

Still another object of this invention is to provide a paint-by-numbers kit of the character described which will enable a more realistic colored picture to be created.

Still a further object of this invention is to provide a paint-by-numbers kit containing paints which can be more easily washed off people and inanimate objects.

Other objects of the invention in part will be obvious and in part will be pointed out hereinafter.

2. Features of the Invention

In keeping with these objects, and others which will become apparent hereinafter, one feature of this invention resides, briefly stated, in a paint-by-numbers kit which includes a book consisting of one or more paper sheets, each displaying a different unpainted drawing to be colored by a user. The unpainted drawings have a plurality of different unpainted picture areas and water-insoluble outlines with, optionally, water-insoluble color separating lines. The paint-by-numbers kit further includes a plurality of differently colored water-based paints for coloring the unpainted areas of the drawings. Each different paint is individually identified by different numbers. There are water-soluble numbers associated with each unpainted area of the drawing, the numbers corresponding to the numbers identifying the differently colored paints for indicating to the user which color paint is to be applied to each different unpainted area of the drawing. The kit also includes a paint applicator, e.g. a brush for permitting the user to apply the paint to the drawing. In this manner the application of liquid water-based paints to the drawing causes the water-soluble numbers to disappear while concomitantly allowing the water-insoluble outlines and color separating lines to remain visible inasmuch as the applied paint is transparent in the sense that all dark lines and areas beneath it can be seen. Thus, the paint-by-numbers kit allows the user to complete a painted picture which is not marred by the presence of numbers appearing through the water-based paints and further prevents the border portions from being accidentally obscured by the coatings of dry paints. The term "numbers" includes symbols and words denoting colors. The afore-mentioned components of the kit need not be packaged together, the coloring pages and paints being capable of being sold separately.

In a preferred embodiment, the drawing to be colored is of a cartoon-type nature. In this type of drawing it is particularly important for the outlines to remain visible after the drawing is colored because the outlines constitute an important part of the completed picture.

The inclusion of water-based paints allows the user to employ the kit without having to exercise extreme caution in an effort to avoid getting the paints on either his person or property. Because the paints are water-based, they are easily washed off of any surface to which they accidentally are applied.

Further, the combination of water-based paints and water-insoluble outlines allows the user to paint without accidentally obscuring the outlines.

The water-soluble numbers guide the user in applying the paints and completely disappear when painted over with water-based paints, thus giving an aesthetically pleasing finished product.

Preferably the paper is glazed to assist the disappearance of the water diluted numbers. Desirably the degree of glazing is such as to permit the paints to be somewhat absorbed.

Accordingly, the user is provided with a paint-by-numbers kit and a method of painting which allows him to complete an aesthetically pleasing, fully painted picture in which all portions meant to remain visible so remain and in which all portions meant to be obliterated by the paints are so obliterated.

BRIEF DESCRIPTION OF THE DRAWINGS

FIG. 1 is a perspective view of the paint-by-numbers kit of the present invention, as used in accordance with the method of said invention;

FIG. 2 is a broken-away view of the lower left-hand corner of the drawing of FIG. 1, and shows a partially painted picture area during painting thereof;

FIG. 3 is a view analagous to FIG. 2, showing the picture area after further painting thereof; and FIG. 4 is a view analagous to FIG. 3, showing the picture area after still further painting thereof.

DETAILED DESCRIPTION OF THE PREFERRED EMBODIMENTS

Referring now in detail to the drawings, the reference numeral 10 denotes the paint-by-numbers kit of the present invention. The kit includes a drawing 12 which has a plurality of unpainted areas, of which the picture area 14 is exemplificative, a plurality of water-insoluble border portions, of which border portion 16 is exemplificative and a plurality of water-insoluble color separating lines of which color separating line 17 is exemplificative. The unpainted picture areas 14, the insoluble border portions 16 and the insoluble color separating lines 17 together constitute an unpainted picture 18 to be painted by the user.

The kit 10 further includes a plurality of different water-based paints 20, 22, 24, 26, 28 for coloring the unpainted picture areas 14. Each different paint 20, 22, 24, 26, 28 is separately identifiable by its own selector means 30, 32, 34, 36, 38. The paints may be in liquid form (already including water as a carrier), or in a dry, solid form to be mixed with water.

Also included in the kit 10, are water-soluble indicia means, of which indicia means 40 is exemplificative. Each unpainted picture area 14 has a different physically-associated indicia means 40. Each indicia means 40 corresponds to a different one of the selector means 30, 32, 34, 36, 38 for indicating to the user which of the paints 20, 22, 24, 26, 28 is to be applied to each of the different unpainted picture areas 14.

A brush 42 is included in the kit 10 for permitting the user to apply paints 20, 22, 24, 26, 28 in admixture with water 44 to the drawing 12 to complete a painted picture.

The application of the water-based paints 20, 22, 24, 26, 28 causes the water-insoluble indicia means 40 to dissolve and disappear and concomitantly allows the water-insoluble border portions 16 and color separating lines 17 to remain visible.

As best seen in FIGS. 2-4, in accordance with the method of this invention, the user first dips the brush 42 into the water 44. The user may wet the brush 42 in any other appropriate manner, e.g. putting it under a running faucet or he may put a small amount of water directly on the dry coloring paints 20, 22, 24, 26, 28. The user then rubs the wet brush 42 on the appropriate paint 20, 22, 24, 26, or 28. The user knows which paint to rub the brush 42 on by looking at the indicia means 40 associated with the picture area 14 he wants to color in. The user chooses the paint 20, 22, 24, 26, 28 which is associated with the selector means 30, 32, 34, 36, 38 that corresponds to the indicia means 40 associated with the unpainted picture area he desires to color.

For example, if the user is about to paint the tail of the mouse which is the picture area 14, the user notes that a certain indicia means 40 is associated with this specific picture area. This indicia means 40 is the numeral "3". The user looks at the different selector means 30, 32, 34, 36, 38 and sees that the selector means 34 is also identified by the numeral "3". Selector means 34 is associated with paint 24 and so the user dips his brush 42 in the water 44, and rubs the wet brush on the paint 24. After the brush 42 has been rubbed on the paint 24, the user proceeds to color in the unpainted picture area 14 with the paint 24 that now is in liquid water-based form.

As the user paints the picture area 14, the indicia means (in this particular example the indicia means is indicia means 40 but the principle is the same for all of the indicia means) will disappear. That is to say, the water in the liquid paint on the brush 42 will cause the water-soluble indicia means 40 to dissolve and disappear. In this way the water-soluble indicia means 40 serves its function—instructing the user which paint should be applied to which picture area—but it does not remain visible after painting and mar the finished, painted picture.

Further, as the user paints the unpainted picture areas 14, he does not have to control the brush 42 in an effort to avoid painting over the insoluble border portions 16 and color separating lines 17. Even if the wet paint is accidentally applied over the insoluble border portions 16 or lines 17, the border portions and lines will remain visible as explained herein.

The drawing 12 of the paint-by-numbers kit 10, in a preferred embodiment, is a panel board consisting of a nonporous paper mounted on 32 pt. stiffening board. The paper preferably is non-porous so that the indicia means 40 does not leave a blotch as it dissolves in the water. Also the water-based paints will not spread out and blotch on non-porous paper.

The paints 20, 22, 24, 26, 28 of the kit 10 are water-based so that they form a transparent layer of color on the display means 12 when brushed thereon by a user. In a preferred embodiment eight different paints are included. Any number of different paints may be included. The number of different paints included in the kit limits the number of different colors which can appear on the completed picture.

Any appropriate water-based paint can be used as the coloring means of the kit 10. In a preferred embodiment, the dry paint which is to be liquified by the addition of water consists generally of:

| Film former blend | |
|---|---|
| Polyvinyl pyrrolidone | 16⅞ oz. (aviordupois) |

-continued

| | |
|---|---|
| Dextrine | 22 oz. av. |
| Exudation agent | 33¾ oz. av. |
| Ultraviolet absorber | 67½0 oz. av. |
| Dispersing agent | 5⅜ oz. av. |
| Wetting agent | ⅛ oz. av. |
| Fungicide | .875 oz. av. |
| Water soluble dye | 2½ oz. av. |

| | Color Index No. |
|---|---|
| Crystal Violet | 42,555 |
| Malachite Green | 42,000 |
| Methylene Blue | 52,015 |
| Carmine Red | 75,470 |
| Chloramine Black Ex (dark) | 30,235 |
| Alizarine Light Green GSN | 25 |
| Victoria Blue | 42,595 |
| Chris Cuprofles 3 LB | Direct Black 63 |

In a preferred embodiment, the water-based paints 20, 22, 24, 26, 28 are in the form of small plaques secured, as by glue, in compartments of a blow-molded palette 46. By so constructing the palette 46, the cost of the kit 10 is kept low and the weight of the kit 10 is also kept low.

The palette 46 also has the selector means 30, 32, 34, 36, 38 which preferably are contained as an integral part of the palette 46 and are blow-molded therein so that there is no chance that said selector means 30, 32, 34, 36, 38 will accidentally separate from their associated coloring means 20, 22, 24, 26, 28.

The selector means 30, 32, 34, 36, 38 in a preferred embodiment are different numerals. As seen in FIG. 1, numerals "1", "2", "3", "4", and "5" are used as selector means. Any other identifying symbols may be used for the selector means 30, 32, 34, 36, 38. For example, letters of the alphabet may be used.

Each selector means corresponds to appropriate indicia means 40. The indicia means 40 in a preferred embodiment are numerals but may be any other appropriate identifying symbols.

The indicia means 40 are water-soluble, having been printed with a preferred embodiment, of a water-soluble ink consisting for example of:

| | PBW |
|---|---|
| Grind - Shot or Ball Mill | |
| Acrysol 1-62 (Acrylic resin water emulsion) (50%) | 26.5 |
| H₂O | 26.4 |
| NaOH | 2.6 |
| Isopropanol | 4.7 |
| Elftex 8 - Carbon black | 13.2 |
| Defoamer Silicone Anti-foam A (Dow Corning) | .1 |
| Total | 73.5 |
| Letdown (Dilution) | |
| Grind | 73.5 |
| Rhoplex 1-53-Acrylic resin (Rohm and Haas) (50%) | 26.5 |
| Total | 100.0 |

Any other appropriate water-soluble ink may be used for the indicia means 40.

As pointed out above the indicia means 40 will dissolve when the wet water-based coloring paints 20, 22, 24, 26, 28 are brushed over the indicia means 40 in the process of painting the picture and will not be visible when the picture is painted.

The border portions 16, as pointed out above, are water-insoluble and in a preferred embodiment are printed in a block letter press ink consisting generally of:

| | PBW |
|---|---|
| Grind - Shot or Ball Mill | |
| Acrysol 1-62 (Acrylic resin water emulsion) (50%) | 26.5 |
| H₂O | 26.4 |
| NH₄OH | 2.6 |
| Isopropanol | 4.7 |
| Elftex 8 - Carbon black | 13.2 |
| Defoamer - Silicon Anti-foam A (Dow Corning) | .1 |
| Total | 73.5 |
| Letdown (Dilution) | |
| Grind | 73.5 |
| Rhoplex 1-53 Acrylic resin (Rohm and Haas) (50%) | 26.5 |
| Total | 100.0 |

Any other appropriate water-soluble ink may be used for the border portions 16.

Since the paints 20, 22, 24, 26, 28 form transparent color layers on the drawing 12 when applied thereon, the water-insoluble border portions 16 will remain visible through the applied paints 20, 22, 24, 26, 28 if said paints accidentally encroach on the border portions 16. Further, because the border portions 16 are water-insoluble they will not dissolve and disappear when they are contacted with the wet water-based paints.

In a preferred embodiment the picture to be painted by a user is a cartoon-type picture and hence it is desirable to have the border portions 16 remain visible in the completed picture. These border portions 16 usually constitute an important part of the completed picture and the picture would not be as aesthetically pleasing if the border portions 16 were obliterated by the coloring means 20, 22, 24, 26, 28.

The brush means 42 of the kit 10 may be any appropriate paint brush. The palette 46 in a preferred embodiment has two integral cradles 48, 50 for supporting the brush means 42. In this manner a user has a place to rest the brush means 42 when it is not in use so that said brush means 42 will not be accidentally lost or accidentally fall onto something and soil it.

It thus will be seen that there are provided a paint-by-numbers kit and a method of using same which achieve the several objects of this invention and which are adapted to the conditions of practical use.

As various possible embodiments might be made of the above invention, and as various changes might be made in the embodiment set forth, it is to be understood that all matters herein described and shown in the accompanying drawings are to be interpreted as illustrative and not in a limited sense.

I claim:

1. A watercolor kit for producing watercolor pictures, comprising:
    (a) a picture sheet having a plurality of picture areas to be painted on a paint-receiving work surface of the sheet, and a plurality of water-insoluble picture lines on the work surface and together with the picture areas constituting a picture;
    (b) a plurality of different water-based watercolor paints for application to the work surface of the picture sheet to produce a watercolor picture;
    (c) a plurality of different selector means for identifying the different colors of the water-based paints;
    (d) a plurality of different water-soluble indicia means each located on the work surface in a respective picture area thereon, each indicia means corresponding to a respective selector means for identifying which water-based paint color is to be applied to the respective picture area; and (e) brush means for applying a selected water-based paint color on the work surface directly over the respective picture area and directly over the water-soluble indicia means located therein and in disappearing relationship with the same to thereby cause the selected water-based paint color itself to dissolve the water-soluble indicia means, and for applying the water-based paint colors over the water-insoluble picture lines and in non-obscuring relationship therewith to thereby permit the picture lines to be visible even if directly covered on the work surface by the water-based paints, whereby the watercolor picture is not marred by the unsightly presence of the indicia means appearing through the applied watercolor paints, and by the covering of the picture lines.

2. The watercolor kit as defined in claim 1, wherein the picture sheet is non-porous paper.

3. The watercolor kit as defined in claim 1, wherein the picture is of a cartoon-type character.

4. The watercolor kit as defined in claim 1, wherein the picture lines include color-separating lines and border lines.

5. The watercolor kit as defined in claim 1, wherein the kit includes a plurality of picture sheets to constitute a coloring book.

6. A method of producing water-color pictures, comprising the steps of:

(a) forming a picture on a paint-receiving work surface of a plurality of picture areas to be painted, and of a plurality of water-insoluble picture lines;

(b) providing a plurality of different water-based watercolor paints for application to the work surface of the picture;

(c) identifying the different colors of the water-based paints;

(d) providing a plurality of different water-soluble indicia means each located on the work surface in a respective picture area, each indicia means corresponding to a different water-based paint for identifying which color is to be applied to the respective area; and (e) applying a selected water-based paint color on the work surface directly over the respective picture area and directly over the water-soluble indicia means located therein and in disappearing relationship with the same to thereby cause the selected water-based paint color itself to dissolve the water-soluble indicia means, and also applying the water-based paint colors over the water-insoluble picture lines and in non-obscuring relationship therewith to thereby permit the picture lines to be visible even if directly covered on the work surface by the water-based paints, whereby the watercolor picture is not marred by the unsightly presence of the indicia means appearing through the applied watercolor paints, and by the covering of the picture lines.

* * * * *